United States Patent [19]

Kaneko et al.

[11] Patent Number: 4,600,370

[45] Date of Patent: Jul. 15, 1986

[54] APPARATUS FOR CARRYING UNVULCANIZED PNEUMATIC TIRES IN TIRE VULCANIZER

[75] Inventors: Shigeru Kaneko; Yoshiaki Hirata; Yoshio Nohara, all of Kodaira, Japan

[73] Assignee: Bridgestone Corporation, Tokyo, Japan

[21] Appl. No.: 734,854

[22] Filed: May 16, 1985

[30] Foreign Application Priority Data

Jun. 12, 1984 [JP] Japan .................. 59-121107
Jun. 12, 1984 [JP] Japan .................. 59-121108

[51] Int. Cl.$^4$ .............................................. B29H 5/02
[52] U.S. Cl. ............................................................ 425/38
[58] Field of Search ................ 425/19, 23, 24, 25, 425/28 R, 32, 33, 35, 38

[56] References Cited

U.S. PATENT DOCUMENTS

| 3,267,515 | 8/1966 | Ulm | 425/33 X |
|---|---|---|---|
| 3,336,636 | 8/1967 | Soderquist | 425/33 |
| 3,380,115 | 4/1968 | Soderquist | 425/38 |
| 3,809,423 | 5/1974 | Gazuit | 425/38 X |
| 4,035,117 | 7/1977 | Nakagawa et al. | 425/38 X |
| 4,190,406 | 2/1980 | Geck et al. | 425/38 |
| 4,279,438 | 7/1981 | Singh | 425/38 X |
| 4,391,769 | 7/1983 | Ichikawa et al. | 425/38 X |
| 4,401,422 | 8/1983 | Amano et al. | 425/38 |
| 4,452,576 | 6/1984 | Sheerer et al. | 425/38 |
| 4,472,125 | 9/1984 | Kubo et al. | 425/38 |

FOREIGN PATENT DOCUMENTS 47-34969 11/1972 Japan .
49-23878 3/1974 Japan .

Primary Examiner—J. Howard Flint, Jr.
Attorney, Agent, or Firm—Cushman, Darby & Cushman

[57] ABSTRACT

An apparatus for carrying unvulcanized pneumatic tires in a tire vulcanizer, comprising: a plurality of upper arcuate segments disposed substantially within a cylindrical surface, each of the upper arcuate segment having at its lower end an upper bead support end for supporting an upper bead portion of the unvulcanized pneumatic tire and a plurality of lower arcuate segments disposed within the upper arcuate segments, each lower arcuate segment having rotatably mounted at its lower end a lower bead support member for supporting a lower bead portion of the unvulcanized pneumatic tire and being movably supported by the corresponding upper arcuate segment. The upper arcuate segments are expandable and contractable radially inward and outward together with the lower arcuate segments. Each of the upper and lower arcuate segments are movable toward and away from with each other and overlapped with each other when moved toward each other.

9 Claims, 21 Drawing Figures

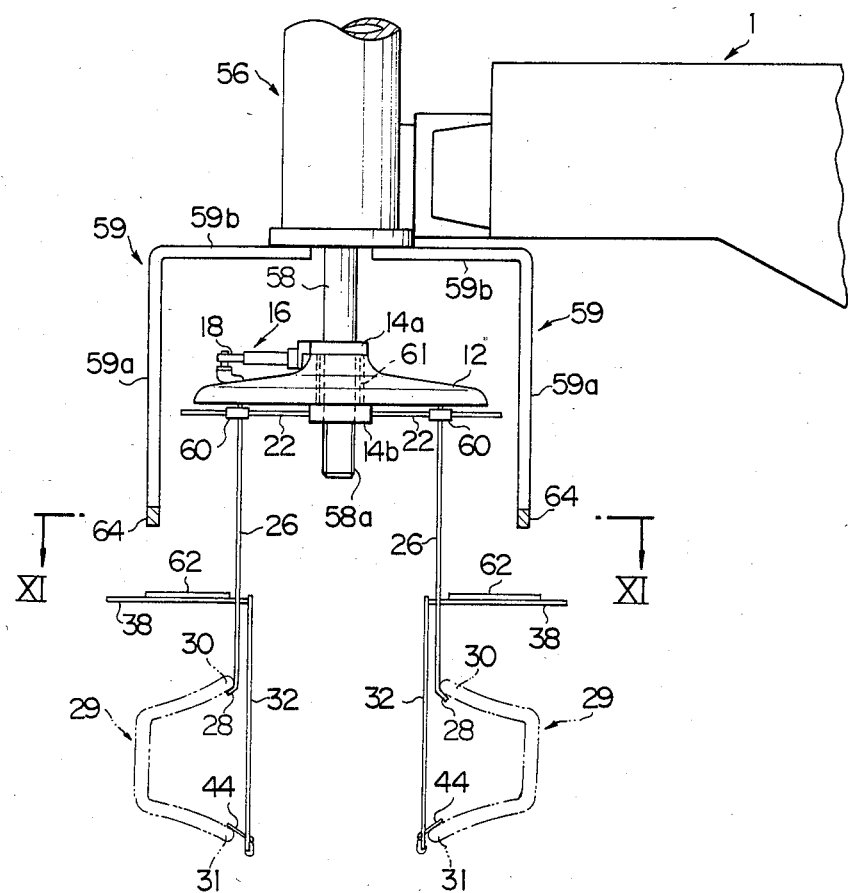

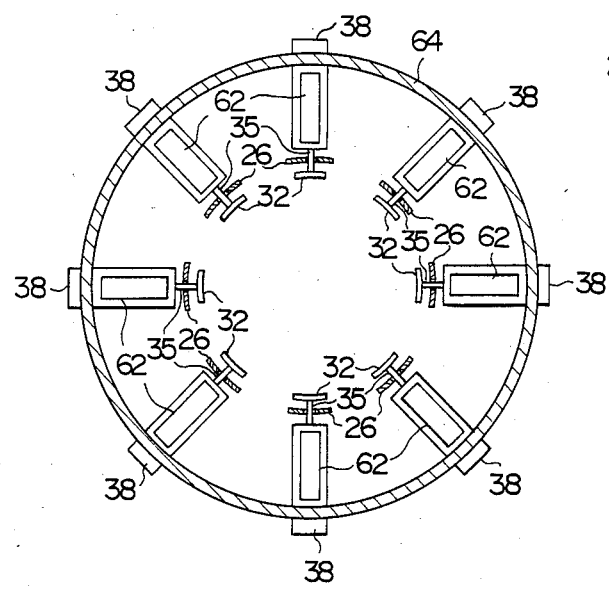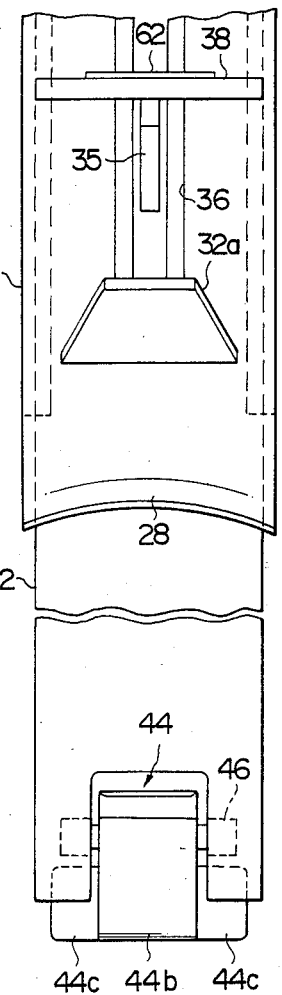

FIG. 17
FIG. 18
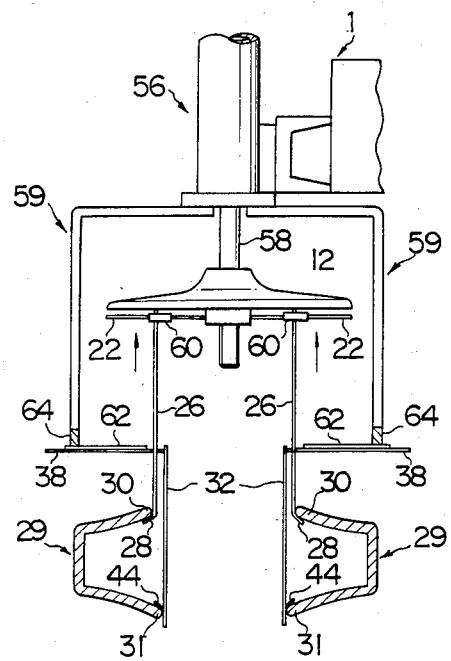
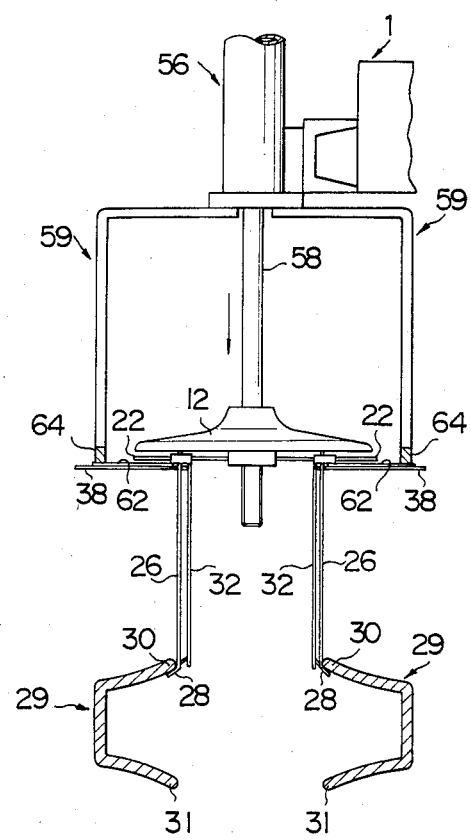

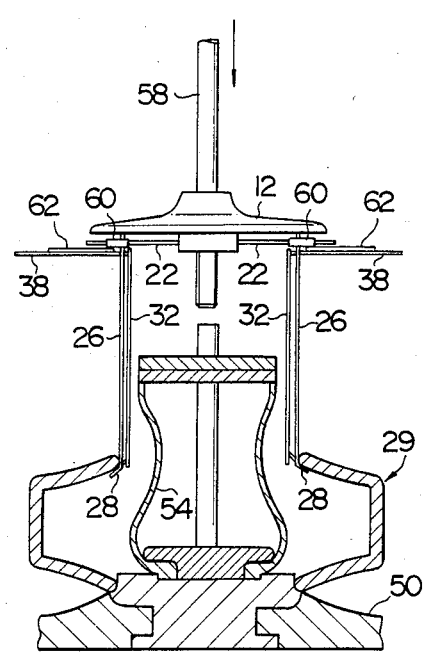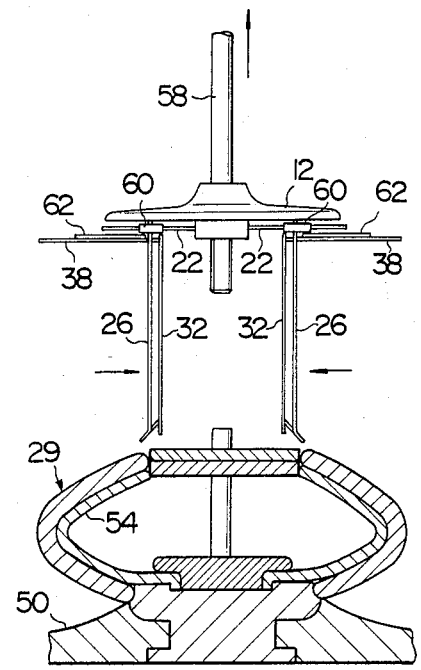

APPARATUS FOR CARRYING UNVULCANIZED PNEUMATIC TIRES IN TIRE VULCANIZER

FIELD OF THE INVENTION

The present invention relates to an apparatus for carrying unvulcanized pneumatic tires in a tire vulcanizer. More particularly, the present invention relates to an apparatus for correcting undesirable asymmerict deformations in the unvulcanized tire prior to vulcanization.

SUMMARY OF THE INVENTION

In accordance with one important aspect of the present invention, there is provided an apparatus for carrying unvulcanized pneumatic tires in a tire vulcanizer, comprising: a plurality of upper arcuate segments disposed substantially within a cylindrical surface, each of the upper arcuate segment having at its lower end an upper bead support end for supporting an upper bead portion of the unvulcanized pneumatic tire; a plurality of lower arcuate segments disposed within the upper arcuate segments, each lower arcuate segment having rotatably mounted at its lower end a lower bead support member for supporting a lower bead portion of the unvulcanized pneumatic tire and being movably supported by the corresponding upper arcuate segment; a plurality of movable support arm members adapted to move the lower lower arcuate segments upward and downward with respect to the upper arcuate segments, each of the upper and lower arcuate segments being overlapped with each other when the lower arcuate segment is moved upward to its uppermost end with respect to the upper arcuate segment; expansion means for radially expanding and contracting inward and outward the upper arcuate segments, the upper arcuate segments being movably mounted to the expansion means; and a swivel arm adapted to turn horizontally and move downward and upward the movable support arm members and the expansion means as a whole, the movable support arm member and the expansion means being supported by the swivel arm; the movable support arm members being movable upward and downward with respect to the swivel arm.

In accordance with another important aspect of the present invention, there is provided an apparatus for carrying unvulcanized pneumatic tires in a tire vulcanizer, comprising: a plurality of upper arcuate segments disposed substantially within a cylindrical surface, each of the upper arcuate segment having at its lower end an upper bead support end for supporting an upper bead portion of the unvulcanized pneumatic tire; a plurality of lower arcuate segments disposed within the upper arcuate segments, each lower arcuate segment having rotatably mounted at its lower end a lower bead support member for supporting a lower bead portion of the unvulcanized pneumatic tire and being movably supported by the corresponding upper arcuate segment; a plurality of stationary support arm members adapted to support the lower lower arcuate segments by magnetic attraction; expansion means for radially expanding and contracting inward and outward the upper arcuate segments, the upper arcuate segments being movably mounted to the expansion means; and a swivel arm adapted to turn horizontally the stationary support arm members and the expansion means as a whole, the stationary support arm member and the expansion means being supported by the swivel arm; the expansion means being movable upward and downward with respect to the swivel arm; each of the upper and lower arcuate segments being overlapped with each other when the upper arcuate segment is moved downward to its lowermost end with respect to the lower arcuate segment by downward movement of the expansion means with the lower arcuate segment supported by the stationary support arm member by magnetic attraction.

DESCRIPTION OF THE PRIOR ART

Unvulcanized pneumatic tires extruded by a tire extruder are generally liable to deform undesirably due to viscous elasticity. In order to avoid the undesirable deformation, the unvulcanized tire is laid on a mounting table with one of the side wall thereof positioned underneath. The unvulcanized tire laid on the table is supported at the several positions thereof and raised, and then carried in a tire vulcanizer by a tire carrying apparatus. In this instance, the unvulcanized tire is supported mostly at the inner circumferential end of an upper bead portion thereof. In some cases, the unvulcanized tire is supported at the outer periphery thereof or at the inner circumferential end of a lower bead portion thereof. If, on the other hand, an unvulcanized tire having the side walls thereof made from a relatively resilient material is laid on the table, an asymmetric deformation, for example, of the side wall in the axial direction thereof or of the bead portion in circularity thereof, tends to occur in the unvulcanized tire. When, therefore, the unvulcanized tire deformed undesirably is carried and vulcanized in the tire vulcanizer, the vulcanized tire would fail to provide proper uniformity of performance. Thus, a drawback has been encountered in that it is difficult to manufacture an unvulcanized tire having proper uniformity in dimension.

It is, accordingly, an important object of the present invention to provide an improved apparatus whereby the asymmetric deformation of the unvulcanized tire is effectively corrected prior to vulcanization.

BRIEF DESCRIPTION OF THE DRAWING

The features and advantages of an apparatus for carrying unvulcanized pneumatic tires in a tire vulcanizer in accordance with the present invention will be more clearly understood from the following description taken in conjunction with the accompanying drawings in which:

FIG. 10 is an elevational side view, generally schematic in form and partly broken away, showing the overall arrangement and construction of the apparatus according to the second embodiment;

FIG. 11 is a view taken substantially along line XI—XI in FIG. 10;

FIG. 12 is a view similar to FIG. 3 but showing a magnet mounted on a lower guide plate;

FIG. 17 is a view showing the upper and lower arcuate segments raised from the position shown in FIG. 16 with the lower arcuate segment supported by a magnetic ring by magnetic attraction.

FIG. 18 is view showing the upper and lower arcuate segments overlapped with each other by moving downward the upper arcuate segment from the position shown in FIG. 17;

FIG. 19 is a view showing the upper and lower arcuate segments as a whole moved downward from the position shown in FIG. 18 into the position in which the unvulcanized tire is placed on the lower mould of the tire vulcanizer;

FIG. 20 is a view showing the upper and lower arcuate segments radially contracted from the position shown in FIG. 19 after shaping of the unvulcanized tire.

DESCRIPTION OF THE PREFERRED EMBODIMENTS

Figure 1:
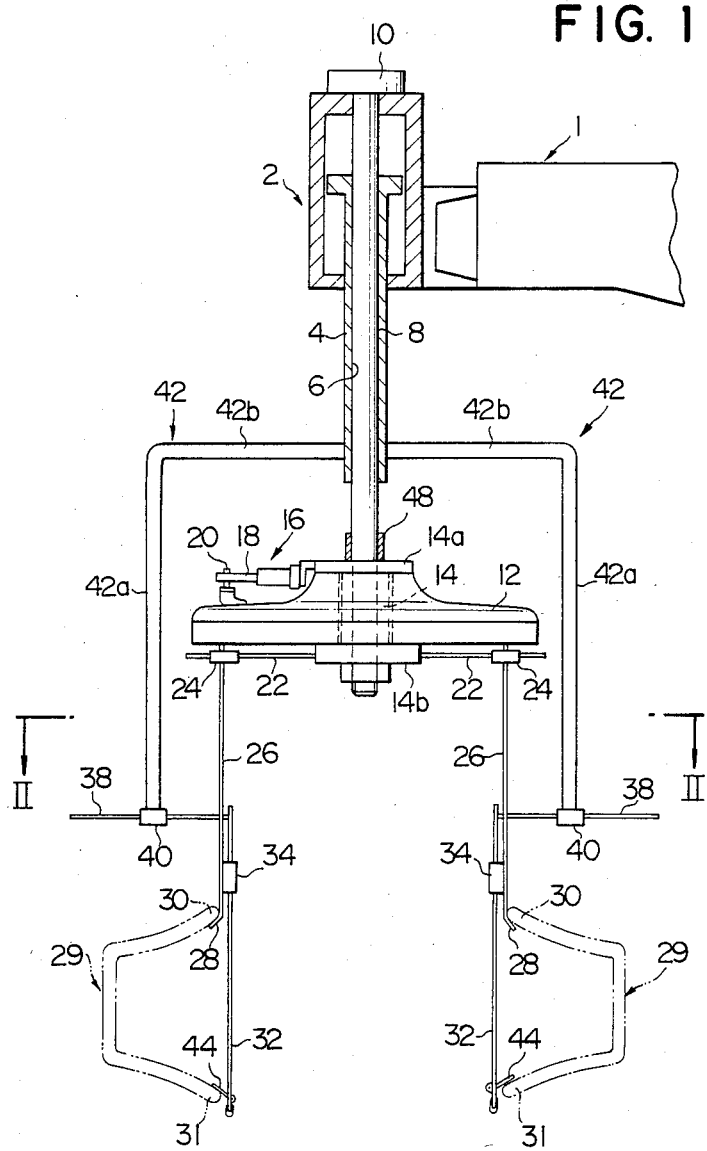
FIG. 1 is an elevational side view, generally schematic in form and partly broken away, showing the overall arrangement and construction of the apparatus according to the first embodiment.

Referring now in greater detail to the drawings and initially to FIG. 1, there is shown an apparatus for carrying unvulcanized pneumatic tires in a tire vulcanizer in accordance with a first preferred embodiment of the present invention. A horizontal swivel arm generally designated by numeral 1 is horizontally turnably mounted to an upstanding rotatable shaft (not shown) which is driven to rotate in opposite directions by a suitable drive means (not shown). The swivel arm 1 is movably supported by a suitable device (not shown) so as to be movable upward and downward. Thus, the swivel arm 1 is turnable in a horizontal plane and movable upward and downward with respect to the horizontal plane. On the swivel arm 1 is mounted a fluid-operated, vertical cylinder 2 having a piston rod 4 protruding downward from and retracting upward in the cylinder body thereof. The piston rod 4 is formed with an axial bore 6 through which a fixed rod 8 passes. The fixed rod 8 has an enlarged end 10 projecting from and fixedly connected to the upper end face of the cylinder body of the vertical cylinder 2. Thus, the piston rod 4 of the vertical cylinder 2 protrudes downward and retracts upward along the fixed rod 8 with respect to the swivel arm 1.

The fixed rod 8 connected to the vertical cylinder 2 has upper and lower stop members 14a and 14b fixedly mounted on the lower end portion thereof. A bush 14 is interposed between the upper and lower stop members 14a and 14b and rotatably mounted on the fixed rod 8. The bush 14 has a rotary member 12 mounted thereon in such a manner that the rotary member 12 is rotatable about the fixed rod 8. A fluid-operated, horizontal cylinder 16 having a piston rod 18 horizontally protruding from and retracting in the cylinder body thereof is disposed between the upper stop member 14a and the rotary member 12 to rotate the rotary member 12 about the fixed rod 8. More specifically, the cylinder body of the horizontal cylinder 16 is connected to the upper stop member 14a, while the piston rod 18 is connected to a projection 20 mounted on the upper surface of the rotary member 12 so that the rotary member 12 is rotatable about the fixed rod 8 by protrusion and retraction of the piston rod 18 of the horizontal cylinder 16.

Figure 2:
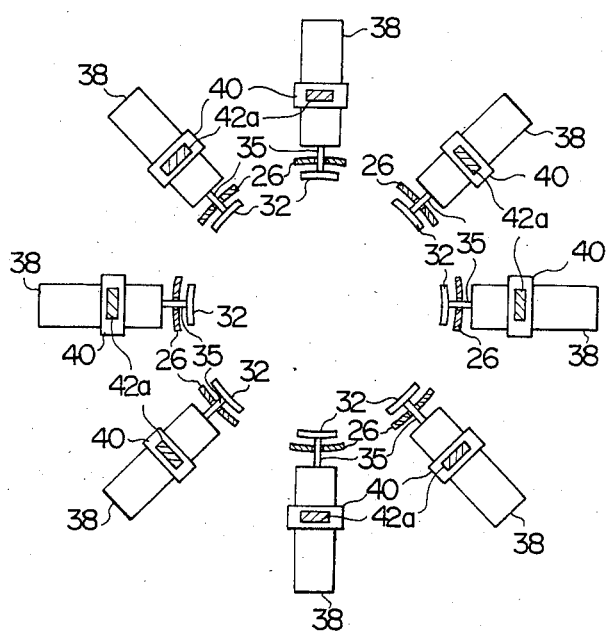
FIG. 2 is a view taken substantially along line II—II in FIG. 1.

On the lower stop member 14b are mounted a plurality of upper elongate guide member 22 each extending radially outward from the lower stop member 14b beyond the circumferential end of the rotary member 12 in a horizontal plane. In this embodiment, there are provided, by way of example, eight upper elongate guide members 22 which are equi-angularly spaced apart with one another around the lower stop member 14b so that the cross sections thereof form substantially a circular. On each upper elongate guide member 22 is slidably mounted a slide member 24 through a sleeve member (not shown) so that the slide member 24 is movable radially inward and outward on and along the corresponding upper elongate guide member 22. Each slide member 24 is connected with an upper arcuate segment 26 which extends downward from the slide member 24. The upper arcuate segments 26 as a whole are disposed substantially within a cylindrical surface as best seen from FIG. 2. The upper end of each upper arcuate segment 26 is loosely received in a spiral-shaped groove (not shown) formed in the lower surface of the rotary member 12. As the rotary member 12 rotates about the fixed rod 8, the distance between the spiral-shaped groove and the axis of the fixed rod 8 is varied. As a consequence, each upper arcuate segment 26 is to move radially inward and outward along the corresponding upper elongate guide member 22. Accordingly, the upper arcuate segments 26 as a whole are radially expandable and contractable with respect to the fixed rod 8.

The above-noted rotary member 12, fluid-operated cylinder 16, upper elongate guide members 22 and slide members 24 as a whole constitute expansion means for radially expanding and contracting inward and outward the upper arcuate segments 26.

Figure 3:
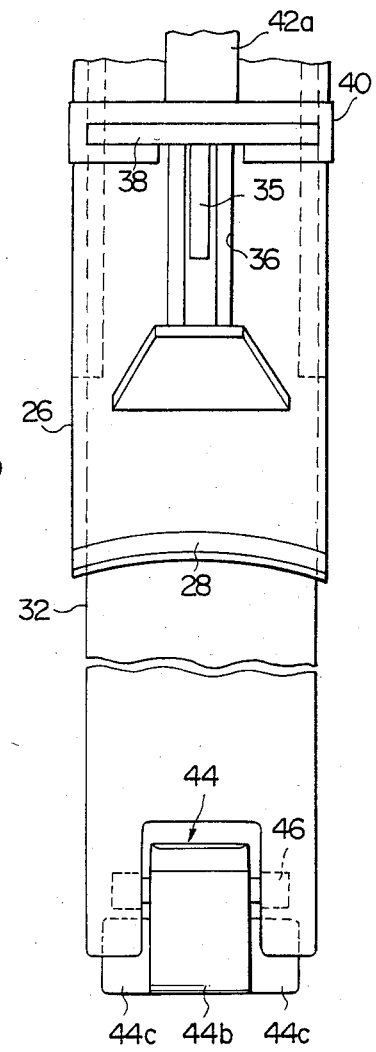
FIG. 3 is an enlarged front view, partly broken away, of the upper and lower arcuate segments.
Figure 4:
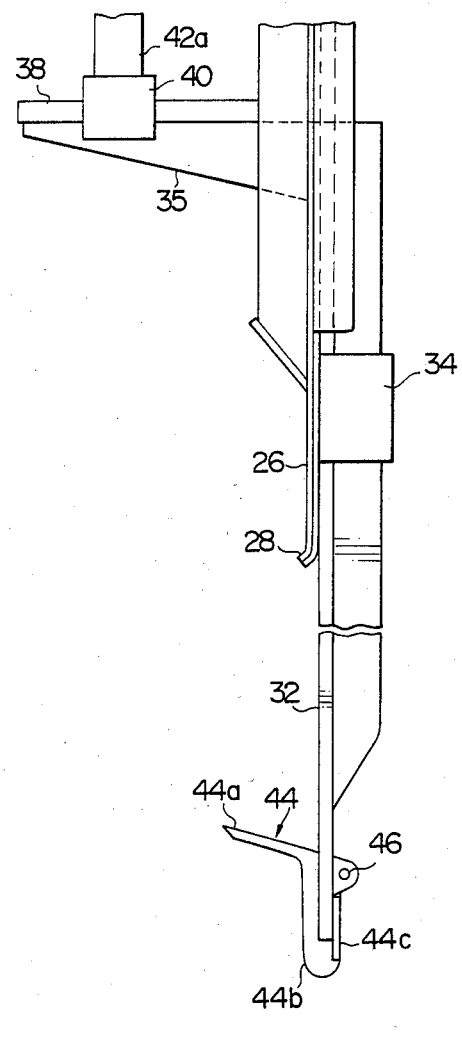
FIG. 4 is an enlarged side view, partly broken away, of the upper and lower arcuate segments with a lower bead support member rotatably mounted on the lower arcuate segment, the lower bead support member being adapted to support a lower bead portion of the tire.

Each upper arcuate segment 26 has at its lower end an upper bead support end 28 for supporting an upper bead portion 30 of an unvulcanized pneumatic tire 29 as shown in FIGS. 1 and 3. The upper bead support end 28 extends downward outward to engage the upper bead portion 30 along the inner circumferential face of the upper bead portion 30. A plurality of lower arcuate segments 32 are disposed within the upper arcuate segments 26 as best seen from FIG. 2. The lower arcuate segment 32 is somewhat narrower in width than the corresponding upper arcuate segment 26. Each lower arcuate segment 32 is slidably received in a guide member 34 mounted on the upper arcuate segment 26 so as to be movable upward and downward with respect to the upper arcuate segment 26. Each lower arcuate segment 32 is connected at upper end thereof with one end of a guide slide 35 as shown in FIG. 4. The guide slide 35 is partly inserted in a longitudinal, elongate slot 36 formed in the upper arcuate segment 26 between the upper and lower end portions of the upper arcuate segment 26 as partly shown in FIG. 3. The guide slide 35 is movable upward and downward between upper and lower ends of the elongate slot 36 and rests normally on the lower end of the elongate slot 36. Thus, each lower arcuate segment 32 is movably supported through the guide slide 35 by the corresponding upper arcuate segment 26. It follows that the lower arcuate segments 32 as a whole are turnable horizontally and movable upward and downward together with the upper arcuate segments 26. On the other hand, each guide slide 35 is connected at the other end thereof to a lower elongate guide member 38 which is arranged below the corresponding upper elongate guide member 22 and extends beyond the outer end of the upper elongate guide member 22. Each lower elongate guide member 38 is horizontally slidably received in a guide member 40 which in turn is carried by an inverted L-shaped, movable support arm member 42 adapted to move the lower lower arcuate segments 32 upward and downward with respect to the upper arcuate segments 26. Each movable support arm member 42 has a vertical portion 42a for carrying the corresponding guide member 40 and a horizontal portion 42b connected to the piston rod 4 of the vertical cylinder 2. The horizontal portions 42b of the movable support arm members 42 are equi-angularly arranged around the piston rod 4. As best shown in FIG. 1, the horizontal portion 42b of each movable support arm member 42 is located above the upper elongate guide member 22, while the vertical portion 42a is located outside the outer end of the upper elongate guide member 22. As noted above, since each lower elongate guide member 38 is slidably received in the corresponding guide member 40 carried by the vertical portion 42a of the movable support arm member 42 and each lower arcuate segment 32 is slidably received in the corresponding guide member 34 mounted on the upper arcuate segment 26, the lower arcuate segments 32 as a whole are radially expandable and contractable together with the upper arcuate segments 26 when the upper arcuate segments 26 are caused to radially expand and contract by operation of the horizontal cylinder 16. Further, the lower arcuate segments 32 as a whole are movable upward and downward in the elongate slots 36 with respect to the upper arcuate segments 26 through the movable support arm members 42 and the lower elongate guide members 38 by operation of the vertical cylinder 2. Each of the upper and lower arcuate segments 26 and 32 are overlapped with each other when the lower arcuate segment 32 is moved upward to its uppermost end with respect to the upper arcuate segment 26.

Figure 5:
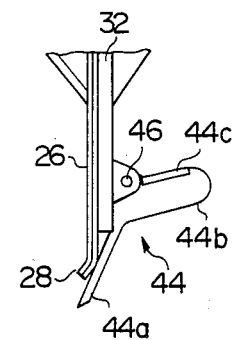
FIG. 5 is a view showing the lower bead support member rotated in an anticlockwise direction from the position shown in FIG. 4 by an upper bead support end of the upper arcuate segment, the upper bead support end being adapted to support an upper bead portion of the tire.

Referring to FIGS. 4 and 5, each lower arcuate segment 32 has at its lower end a lower bead support member 44 for supporting a lower bead portion 31 (FIG. 1) of the unvulcanized pneumatic tire 29. The lower bead support member 44 is rotatably mounted on the lower end portion of the corresponding lower arcuate segment 32 through a rotatable pin 46. The lower bead support member 44 has a support portion 44a for supporting the lower bead portion 31 and a weighted portion 44b for normally biasing the support portion 44a in a clockwise direction in FIG. 4. The lower bead support member 44 further has a pair of lug portions 44c (FIG. 3) which are engageable with the lower end of the lower arcuate segment 32. The lug portions 44c prevent the lower bead support member 44 for rotating in the clockwise direction in FIG. 4 when is brought into engagement with the lower arcuate segment 32. On the other hand, when the lower arcuate segment 32 in its entirety is raised and overlapped by the corresponding upper arcuate segment 26, the lower bead support member 44 is caused to rotate in a counterclockwise direction in FIG. 4 and the support portion 44a thereof is engaged by the upper bead support end 28 of the upper arcuate segment 26 as shown in FIG. 5.

Returning back to FIG. 1, there is provided a spacer 48 on the fixed rod 8 for adjusting reciprocating motion of the piston rod 4 of the vertical cylinder 2. The reciprocating motion of the piston rod 4 is adjusted dependent upon various widths between the upper and lower bead portions of various tires by replacement of the spacer 48 with various spacers of various predetermined lengths.

Figure 6:
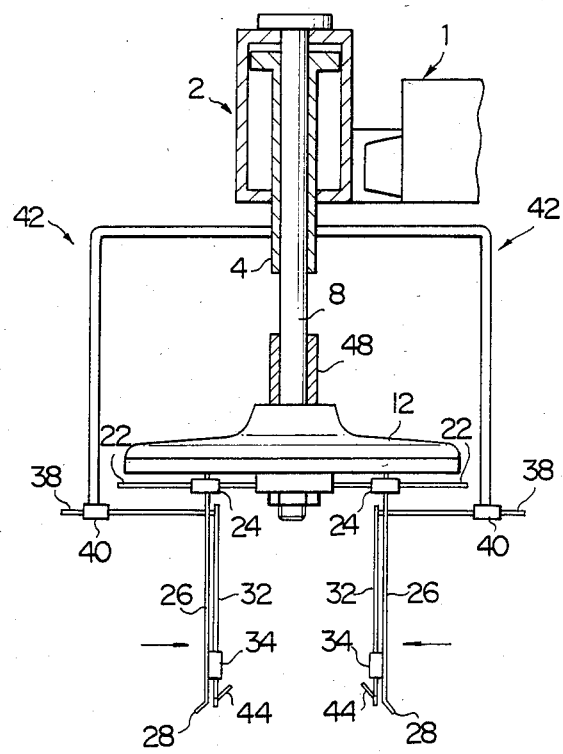
FIG. 6 is a view showing the relative positions assumed by the upper and lower arcuate segments at the beginning stage of tire carrying cycle, the lower arcuate segment being arranged in its uppermost position with respect to the upper arcuate segment.
Figure 7:
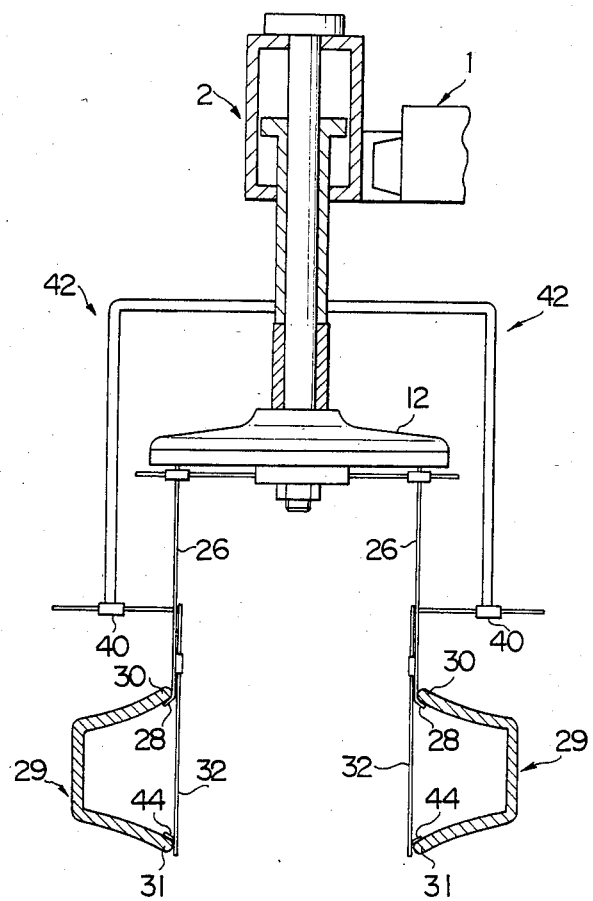
FIG. 7 is a view showing the relative positions assumed by the upper and lower arcuate segments with the unvulcanized tire supported thereby, the lower arcuate segment being arranged in its lowermost position with respect to the upper arcuate segment.
Figure 8:
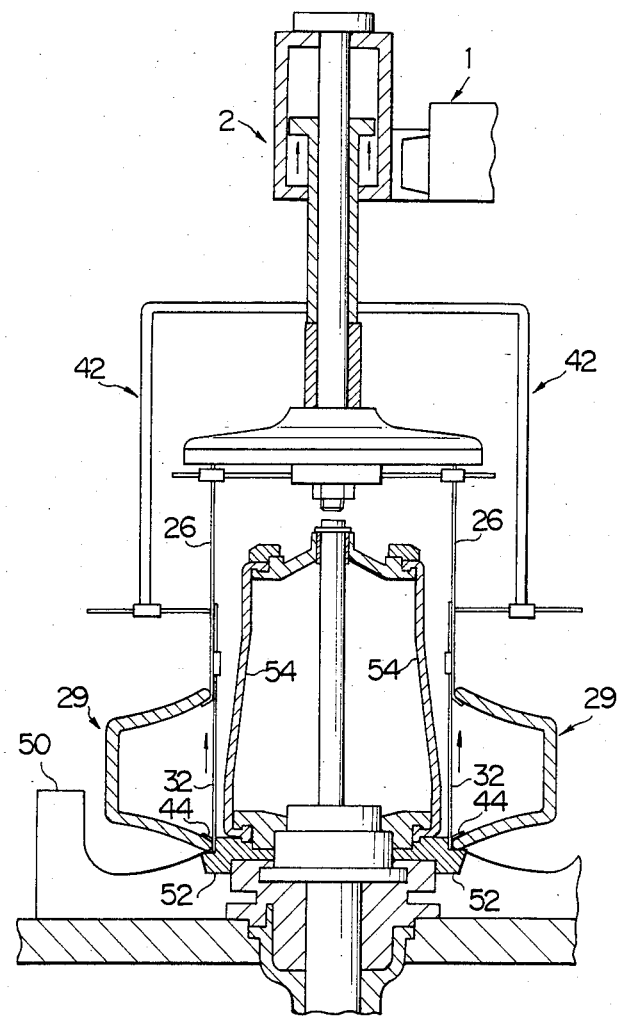
FIG. 8 is a view showing the upper and lower arcuate segments as a whole moved downward from the position shown in FIG. 6 into the position in which the unvulcanized tire is placed on a lower mould of the tire vulcanizer.
Figure 9:
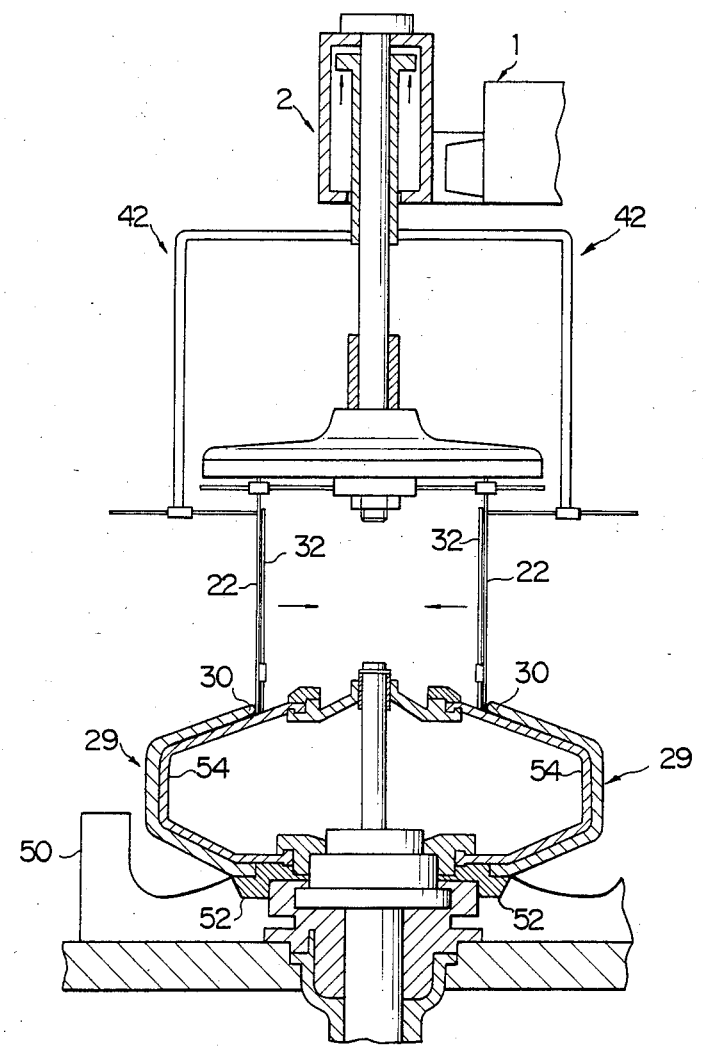
FIG. 9 is a view showing the upper and lower arcuate segment overlapped with each other by moving the lower arcuate segment in the directions indicated in FIG. 8 and showing the tire formed into a toroidal configuration by expansion of a bladder.

The operation of the first embodiment according to the present invention will now be described in detail in conjunction with FIGS. 6 to 9, and for this purpose it will be assumed that, as shown in FIG. 6, the upper and lower arcuate segments 26 and 32 are radially contracted by the operation of the horizontal cylinder 16 and that the upper and lower arcuate segments 26 and 32 are overlapped with each other by the operation of the vertical cylinder 2. With this condition, the swivel arm 1 turns horizontally until the upper and lower arcuate segments 26 and 32 are arranged above a predetermined position at which the unvulcanized pneumatic tire 29 lies on a mounting table (not shown). After the arrangement, the swivel arm 1 turned in a horizontal plane moves downward until the upper bead support ends 28 of the upper arcuate segments 26 are inserted inside the upper bead portion 30 of the unvulcanized tire 29. The rotary member 12 is then driven to rotate by the operation of the horizontal cylinder 16 to bring the upper arcuate segments 26 into engagement with the inner circumferential face of the upper bead portion 30 of the unvulcanized tire 29. As a consequence, the unvulcanized tire 29 is supported at the upper bead portion 30 thereof by the upper bead support ends 28 of the upper arcuate segments 26. With the upper bead portion 30 supported by the upper arcuate segments 26, the swivel arm 1, the vertical cylinder 2 and the upper arcuate segments 26 as a whole are moved upward by the operation of the device associated with the swivel arm 1. After the unvulcanized tire 29 is raised from the mounting table, the lower arcuate segments 32 protrude downward from the upper arcuate segments 26 as the piston rod 4 protrudes downward from the vertical cylinder 2. In this instance, the lower bead support members 44 of the lower arcuate segments 32 are disengaged from the upper bead support ends 28 of the upper arcuate segments 26. As a consequence, the lower bead support members 44 is caused to rotate about the rotatable pin 46 by the weighted portion 44b thereof so that the support portions 44a thereof are disposed outside the lower arcuate segments 32. The lower arcuate segments 32 further move downward until the support portions 44a of the lower bead support members 44 are brought into abutting engagement at their lower surfaces with the inner circumferential face of the lower bead portion 31 as shown in FIG. 7. In this instance, the lower bead support member 44 of the lower arcuate segments 32 push slightly downward and support the lower bead portion 31, and are then brought to stop by the engagement of the piston rod 4 with the spacer 48. With this condition, the unvulcanized tire 29 is supported by the upper and lower arcuate segments 26 and 32 during vulcanization of a prior unvulcanized tire, for example, about ten to twenty minutes in the case of passenger tires. In the meantime, asymmetric deformations resulting from viscous elasticity of the unvulcanized tire are removed because the upper and lower bead portions 30 and 31 of the tire 29 are supported in opposite directions by the upper and lower arcuate segments 26 and 32, respectively. Namely, deformations of the unvulcanized tire in the axial direction thereof and of the bead portions in circularities thereof are effectively corrected prior to vulcanization. After the vulcanization of the prior tire, the unvulcanized tire 29 is transferred above a lower mould 50 (FIG. 8) of the tire vulcanizer by the horizontal turn of the swivel arm 1. The upper and lower arcuate segments 26 and 32 then move downward until the lower bead portion 31 of the unvulcanized tire 29 is placed on a lower bead ring 52 of the lower mould 50. In this instance, by the very fact that the inner circumferential face of the lower bead portion 31 of the unvulcanized tire 29 is supported by the lower bead support members 44 of the lower arcuate segments 32, when the lower bead portion 31 is placed on the lower mould 50, the lower bead portion 31 is pressed against the lower bead ring 52 of the lower mould 50 with a substantially equal pressure. Accordingly, the unvulcanized tire 29 is placed on the lower mould 50 without having undesired deformations thereof. After the placement of the unvulcanized tire 29 on the lower mould 50, the lower arcuate segments 32 are raised in the directions indicated by arrows in FIG. 8 by the upward movement of the piston rod 4 of the vertical cylinder 2 so as to be overlapped by the upper arcuate segments 26. The lower bead support members 44 of the lower arcuate segments 32 are also overlapped by the upper arcuate segments 26. With the upper bead portion 30 supported by the upper arcuate segments 26 as shown in FIG. 9, the unvulcanized tire 29 is then shaped into a toroidal configuration by an expandable bladder 54. After the shaping of the unvulcanized tire 29, the upper arcuate segments 26 are contracted in the directions indicated by arrows in FIG. 9, by the operation of the horizontal cylinder 16, so that the upper bead support ends 28 thereof disengage from the upper bead portion 30 of the tire 29. The upper and lower arcuate segments 26 and 32 are then raised. Finally, the swivel arm 1 turns horizontally until the upper and lower arcuate segments 26 and 32 return back to the initial position above the position at which a new unvulcanized pneumatic tire lies on the mounting table.

Referring to FIGS. 10 to 21, there is shown a second preferred embodiment of the present invention which is substantially similar to the first embodiment described hereinabove. Members and parts substantially identical in construction and function to those of the first embodiment are identified by same numerals for avoiding the detail description therefor. In this second embodiment, on a swivel arm 1 is mounted a fluid-operated, vertical cylinder 56 having a piston rod 58 protruding downward from and retracting upward in the cylinder body thereof. The piston rod 58 has at its lower end portion an externally threaded portion 58a for receiving an internally threaded bush 61. The bush 61 is interposed between upper and lower stop members 14a and 14b and has a rotary member 12 rotatably mounted thereon. Thus, in the second embodiment, the rotary member 12 is movable upward and downward with respect to the swivel arm 1 by protrusion and retraction of the piston rod 58 of the vertical cylinder 56. A fluid-operated, horizontal cylinder 16 having a piston rod 18 is disposed between the upper stop member 14a and the rotary member 12. On the other hand, on the lower stop member 14b are mounted a plurality of horizontal, elongate upper elongate guide members 22. In the same way to the first embodiment, there are also provided, by way of example, eight upper elongate guide members 22 which are equi-angularly spaced apart with one another around the lower stop member 14b so that the cross sections thereof form substantially a circular. In this second embodiment, on each upper elongate guide member 22 is slidably mounted a magnetic slide member 60 through a sleeve member (not shown). Each magnetic slide member 60 is connected with an upper arcuate segment 26 which extends downward from the magnetic slide member 60. The upper end of each upper arcuate segment 26 is loosely received in a spiral-shaped groove (not shown) formed in the lower surface of the rotary member 12 so that each upper arcuate segment 26 moves on and along the corresponding upper elongate guide member 22 through the magnetic slide member 60. Thus, the upper arcuate segments 26 as a whole are radially expandable and contractable with respect to the piston rod 58 of the vertical cylinder 56. Each upper arcuate segment 26 has at its lower end an upper bead support end 28 for supporting an upper bead portion 30 of an unvulcanized pneumatic tire 29 indicated by phantom lines in FIG. 10.

Figure 13:
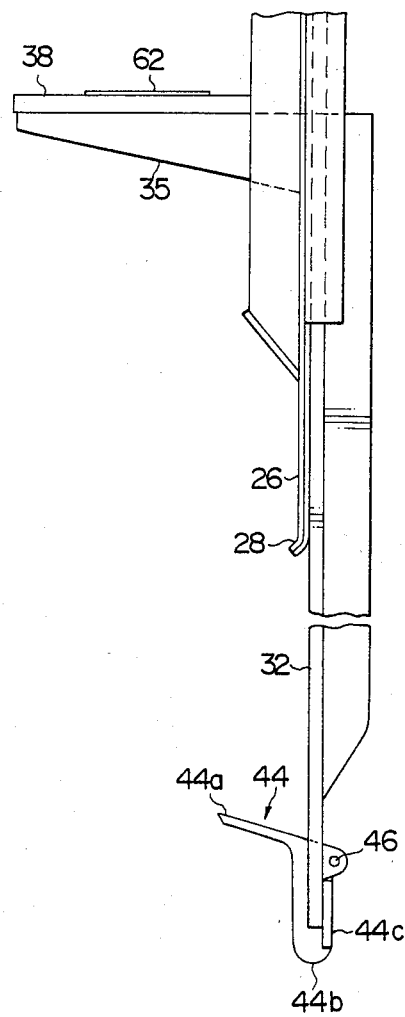
FIG. 13 is a view similar to FIG. 4.

A plurality of lower arcuate segments 32 are disposed within the upper arcuate segments 26 as best seen from FIG. 11. Each lower arcuate segment 32 is somewhat narrower in width than the corresponding upper arcuate segment 26 as shown in FIG. 12. Each lower arcuate segment 32 is connected at its upper end with one end of a guide slide 35 as shown in FIG. 13. Each guide slide 35 is partly inserted in a longitudinal, elongate slot 36 formed in each upper arcuate segment 26. On the other hand, each guide slide 35 is connected at the other end thereof to a horizontal, elongate lower elongate guide member 38. The guide slides 35 are prevented from slipping from the elongate slots 36 by the lower arcuate segments 32 and the lower elongate guide members 38 and normally rest on stop members 32a provided in the lower ends of the elongated slots 36. Accordingly, the lower arcuate segments 32 are movable upward and downward with respect to the upper arcuate segments 26 and also radially expandable and contractable with the upper arcuate segments 26.

Figure 14:
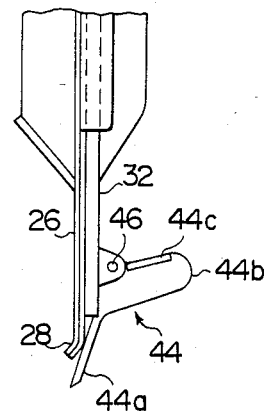
FIG. 14 is a view substantially similar to FIG. 5.

Referring to FIGS. 13 and 14, each lower arcuate segment 32 has at its lower end a lower bead support member 44 for supporting a lower bead portion 31 (FIG. 10) of the unvulcanized pneumatic tire 29. Each lower bead support member 44 is rotatably mounted on the lower end portion of the corresponding lower arcuate segment 32 through a rotatable pin 46. The lower bead support member 59 has a support portion 44a for supporting the lower bead portion 31 and a weighted portion 59b for normally biasing the support portion 59a in a clockwise direction in FIG. 13. The lower bead support member 44 further has a lug portions 59c which are engageable with the lower end of the lower arcuate segment 32.

Returning back to FIG. 10, on the vertical cylinder 56 are mounted a plurality of an inverted L-shaped, stationary support arm member 59 adapted to support the lower lower arcuate segments 32 by magnetic attraction. Each stationary support arm member 59 has a vertical portion 59a for carrying a circular magnetic stop ring 64 and a horizontal portion 59b connected to the lower end face of the cylinder body of the vertical cylinder 56. The magnetic stop ring 64 is adapted to support the lower elongate guide members 38 by magnetic attraction. Thus, the stationary support arm members 59 are adapted to support the lower lower arcuate segments 32 through the lower elongate guide members 38 by magnetic attraction. The lower elongate guide member 38 has a horizontal, elongate portion which is engageable with the magnetic stop ring 64 regardless of the radial expansion and contraction of the lower arcuate segments 32. The vertical portions 59a of the stationary support arm members 59 have sufficient lengths in the vertical direction thereof so that the magnetic stop ring 64 is engaged by the lower elongate guide members 38 moved halfway up. In this second embodiment, each lower elongate guide member 38 has an elongate magnet 62 mounted on the upper surface thereof. The elongate magnet 62 engages the magnetic stop ring 64 when the lower arcuate segments 32 move radially outward and disengages from the magnetic stop ring 64 when the lower arcuate segments 32 move radially inward. The elongate magnet 62 further engages the magnetic slide member 60 when the lower elongate guide member 38 is raised to the upper elongate guide member 22.

Figure 15:
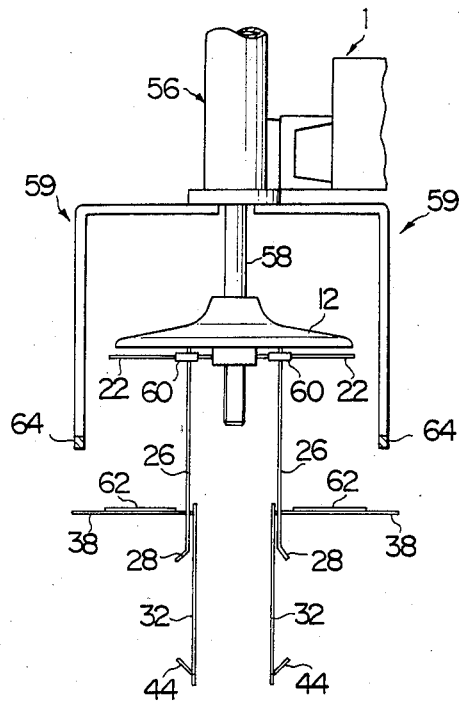
FIG. 15 is a view showing the relative positions assumed by the upper and lower arcuate segments of the apparatus according to the second embodiment at the beginning stage of tire carrying cycle.
Figure 16:
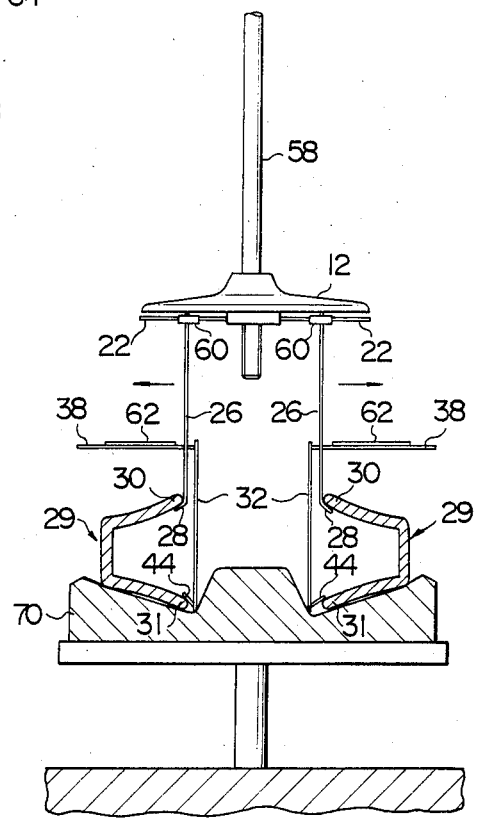
FIG. 16 is a view showing the upper and lower arcuate segments as a whole moved downward from the position in FIG. 16 and expanded radially.
Figure 21:
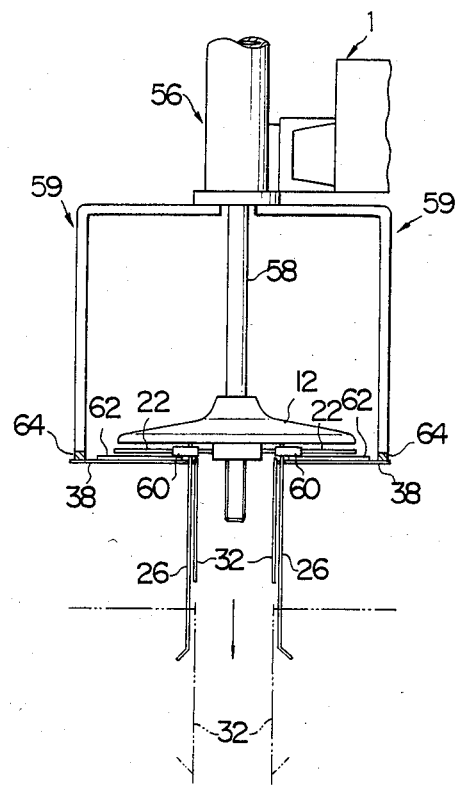
FIG. 21 is a view showing the upper and lower arcuate segments as a whole moved upward from the position shown in FIG. 20.

The operation of the second embodiment according to the present invention will now be described in detail in conjunction with FIGS. 15 to 21, and for this purpose it will be assumed that, as shown in FIG. 15, the upper and lower arcuate segments 26 and 32 are radially contracted by the operation of the horizontal cylinder 16 and that the lower arcuate segments 32 are supported by the upper arcuate segments 26. With this condition, the swivel arm 1 turns horizontally so that the upper and lower arcuate segments 26 and 32 are arranged above a predetermined position at which the unvulcanized tire 29 lies on a mounting table 70 (FIG. 16). After the arrangement, the piston rod 58 of the vertical cylinder 56 protrudes downward until the upper bead support ends 28 of the upper arcuate segments 26 and the lower bead support members 44 of the lower arcuate segments 32 are inserted inside the upper and lower bead portion 30 and 31, respectively, of the unvulcanized tire 29. The rotary member 12 is then driven to rotate by the operation of the horizontal cylinder 16 to bring the upper bead support ends 28 of the upper arcuate segments 26 into engagement with the inner circumferential face of the upper bead portion 30 of the tire 29. At the same time, since the lower arcuate segments 32 are supported by the upper arcuate segments 26, the lower bead support members 44 are also brought into contact with the inner circumferential face of the lower bead portion 31 of the tire 29. The rotary member 12 then ceases from rotating to cease the motion of the upper arcuate segments 26. In this instance, it will be understood that, since the lower arcuate segments 32 are brought into abutting engagement at their lower extremities with the mounting table 70 as shown in FIG. 16 and raised slightly, the lower bead support members 44 slightly contact the lower bead portion 31. As the upper arcuate segments 26 is then caused to move upward in the direction indicated by arrows in FIG. 17 by the operation of the vertical cylinder 56, the unvulcanized tire 29 supported by the upper bead support ends 28 of the upper arcuate segments 26 is raised. The upper arcuate segments 26 further move upward until the magnets 62 on the lower elongate guide members 38 engage and attract the magnetic stop ring 64. In this instance, since the upward movement of the lower arcuate segments 32 is ceased by the magnetic stop ring 64, the lower arcuate segments 32 are caused to move in the opposite direction, namely, downward by counteracting force, so that the lower bead portion 31 of the unvulcanized tire 29 is depressed. When the lower bead portion 31 of the tire is properly depressed, the upward movement of the upper arcuate segments 26 are brought to stop. With this condition, the unvulcanized tire 29 is supported by the upper and lower arcuate segments 26 and 32 during vulcanization of a prior unvulcanized tire, for example, about ten to twenty minutes in the case of passenger tires. In the meantime, asymmetric deformations resulting from viscous elasticity of the unvulcanized tire are removed because the upper and lower bead portions 30 and 31 are supported in the opposite directions by the upper and lower arcuate segments 26 and 32, respectively.

After the prior tire is vulcanized, the unvulcanized tire 29 is transferred above a lower mould 50 (FIG. 19) of the tire vulcanizer by the horizontal turn of the swivel arm 1. The piston rod 58 of the vertical cylinder 56 then move downward in the direction indicated by arrow in FIG. 18 to move downward the upper arcuate segments 26. In this instance, since the lower elongate guide members 38 are supported on the magnetic stop ring 64 by magnetic attraction of the magnet 62, the lower arcuate segments 32 do not move but only the upper arcuate segments 26 move downward. Thus, each of the upper and lower arcuate segments 26 and 32 are overlapped with each other when the upper arcuate segment 26 is moved downward to its lowermost end with respect to the lower arcuate segment 26 by downward movement of the rotary member 12 with the lower arcuate segment 32 supported by the stationary support arm member 59 by magnetic attraction. The upper arcuate segments 26 further move downward until the magnetic slide members 60 on the upper elongate guide members 22 are engaged and attracted by the magnets 62 on the lower elongate guide members 38. The upper arcuate segments 26 further move downward to disengage the lower arcuate segments 32 from the magnetic stop ring 64. Thus, since the lower arcuate segments 32 are engaged by the magnetic slide members 60, the lower arcuate segments 32 is to move downward together with the upper arcuate segments 26. As shown in FIG. 19, the unvulcanized tire 29 supported by the upper arcuate segments 26 is then placed on the lower mould 50. With the upper bead portion 30 of the tire 29 supported by the upper bead support ends 28 of the upper arcuate segments 26, the unvulcanized tire 29 is then shaped into a toroidal configuration by an expandable bladder 54. After the shaping of the unvulcanized tire 29, the upper arcuate segments 26 is caused to contract in the direction indicated by arrows in FIG. 20, by the operation of the horizontal cylinder 16, so that the upper bead support ends 28 thereof disengage from the upper bead portion 30 of the tire 29. The upper and lower arcuate segments 26 and 32 are then caused to raise by the operation of the vertical cylinder 2. The upper and lower arcuate segments 26 and 32 move upward until the lower elongate guide members 38 are brought into engagement with the magnetic stop ring 64. In this instance, since the magnet 62 is caused to locate within the magnetic stop ring 64 by the above-noted contraction of the upper arcuate segments 26, the lower elongate guide members 22 are no longer supported by the magnetic stop ring 64. Accordingly, since the lower arcuate segments 32 are disengaged from the magnetic slide member 60 as the upper arcuate segments 26 further move upward, the lower arcuate segments 32 fall plumb down in the direction indicated by arrow in FIG. 21 by their weights and are supported by the upper arcuate segments 26 as indicated by phantom lines in FIG. 21. Finally, the swivel arm 1 turns horizontally so that the upper and lower arcuate segments 26 and 32 return back to the initial position above the position at which a new unvulcanized pneumatic tire lies on the mounting table 70.

It will be readily apparent to those skilled in the art that the present invention has general utility in the tire construction art as a means for carrying unvulcanized tires in a tire vulcanizer. Thus, various modifications and re-arrangements may be made in the embodiments selected for disclosing my invention without departing from the spirit and scope of the invention.

What is claimed is:

1. An apparatus for carrying unvulcanized pneumatic tires in a tire vulcanizer, comprising:
   a plurality of upper arcuate segments disposed substantially within a cylindrical surface, each of the upper arcuate segment having at its lower end an upper bead support end for supporting an upper bead portion of the unvulcanized pneumatic tire;
   said upper arcuate segments as a whole being expandable and contractable radially inward and outward;
   said upper arcuate segments as a whole being turnable horizontally and movable upward and downward; and
   a plurality of lower arcuate segments disposed within said upper arcuate segments, each lower arcuate segment having rotatably mounted at its lower end a lower bead support member for supporting a lower bead portion of the unvulcanized pneumatic tire and being movably supported by the corresponding upper arcuate segment;
   said lower arcuate segments as a whole being expandable and contractable radially inward and outward together with said upper arcuate segments;
   said lower arcuate segments as a whole being turnable horizontally and movable upward and downward together with said upper arcuate segments;
   each of said upper and lower arcuate segments being movable toward and away from with each other and overlapped with each other when moved toward each other.

2. An apparatus for carrying unvulcanized pneumatic tires in a tire vulcanizer, comprising:
   a plurality of upper arcuate segments disposed substantially within a cylindrical surface, each of the upper arcuate segment having at its lower end an upper bead support end for supporting an upper bead portion of the unvulcanized pneumatic tire;
   a plurality of lower arcuate segments disposed within said upper arcuate segments, each lower arcuate segment having rotatably mounted at its lower end a lower bead support member for supporting a lower bead portion of the unvulcanized pneumatic tire and being movably supported by the corresponding upper arcuate segment;
   a plurality of movable support arm members adapted to move said lower lower arcuate segments upward and downward with respect to the upper arcuate segments, each of said upper and lower arcuate segments being overlapped with each other when said lower arcuate segment is moved upward to its uppermost end with respect to said upper arcuate segment;
   expansion means for radially expanding and contracting inward and outward said upper arcuate segments, the upper arcuate segments being movably mounted to said expansion means; and
   a swivel arm adapted to turn horizontally and move downward and upward said movable support arm members and said expansion means as a whole, said movable support arm member and said expansion means being supported by said swivel arm;
   said movable support arm members being movable upward and downward with respect to said swivel arm.

3. An apparatus for carrying unvulcanized pneumatic tires in a tire vulcanizer, comprising:
   a plurality of upper arcuate segments disposed substantially within a cylindrical surface, each of the upper arcuate segment having at its lower end an upper bead support end for supporting an upper bead portion of the unvulcanized pneumatic tire;
   a plurality of lower arcuate segments disposed within said upper arcuate segments, each lower arcuate segment having rotatably mounted at its lower end a lower bead support member for supporting a lower bead portion of the unvulcanized pneumatic tire and being movably supported by the corresponding upper arcuate segment;
   a plurality of stationary support arm members adapted to support said lower lower arcuate segments by magnetic attraction;
   expansion means for radially expanding and contracting inward and outward said upper arcuate segments, the upper arcuate segments being movably mounted to said expansion means; and
   a swivel arm adapted to turn horizontally said stationary support arm members and said expansion means as a whole, said stationary support arm member and said expansion means being supported by said swivel arm;
   said expansion means being movable upward and downward with respect to said swivel arm;
   each of said upper and lower arcuate segments being overlapped with each other when said upper arcuate segment is moved downward to its lowermost end with respect to said lower arcuate segment by downward movement of said expansion means with said lower arcuate segment supported by said stationary support arm member by magnetic attraction.

4. An apparatus as set forth in claim 2, in which said expansion means is constituted by a rotary member, a fluid-operated cylinder adapted to rotate said rotary member, a plurality of upper elongate guide members provided below said rotary member and extending radially outward in a horizontal plane, a plurality of slide member each slidably mounted on the corresponding upper elongate guide member and connected with the corresponding upper arcuate segment.

5. An apparatus as set forth in claim 4, in which each of said upper arcuate segment has a guide member mounted thereon and is formed with a slot and in which each of said lower arcuate segment is slidably received in said guide member mounted on said upper arcuate segment and connected through said slot with a lower elongate guide member and in which each of said movable support arm member has a horizontal portion located above the corresponding upper arcuate segment and a vertical portion located outside the upper arcuate segment, the vertical portion having carried thereon a guide member to receive said lower elongate guide member said movable support arm member has carried thereon a guide member to receive said lower elongate guide member.

6. An apparatus as set forth in claim 3, in which said expansion means is constituted by a rotary member, a fluid-operated cylinder adapted to rotate said rotary member, a plurality of upper elongate guide members provided below said rotary member and extending radially outward in a horizontal plane, a plurality of magnetic slide member each slidably mounted on the corresponding upper elongate guide member and connected with the corresponding upper arcuate segment.

7. An apparatus as set forth in claim 6, in which each of said upper arcuate segment is formed with a slot and in which each of said lower arcuate segment has a magnet mounted thereon and in which each of said movable support arm member has a horizontal portion located above the corresponding upper arcuate segment and a vertical portion located outside the upper arcuate segment, the vertical portion having a circular magnetic stop ring carried thereon.

8. An apparatus as set forth in claim 5, in which said swivel arm has mounted thereon a fluid-operated cylinder having a piston rod formed with an axial bore through which a fixed rod passes, the piston rod being connected with said horizontal portions of said movable support arm members, the fixed rod having said rotary member of said expansion means rotatably mounted thereon.

9. An apparatus as set forth in claim 7, in which said swivel arm has mounted thereon a fluid-operated cylinder having a piston rod, the cylinder being connected with said horizontal portions of said stationary support arm members, the piston rod having said rotary member of said expansion means rotatably mounted thereon.

* * * * *